United States Patent [19]
Stevenson

[11] Patent Number: 5,179,975
[45] Date of Patent: Jan. 19, 1993

[54] CHEMICAL MIXING AND DELIVERY SYSTEM

[76] Inventor: Jim Stevenson, 3041 Fain La., Georgetown, Calif. 95634

[21] Appl. No.: 782,375

[22] Filed: Oct. 24, 1991

[51] Int. Cl.⁵ .............................................. E03B 5/00
[52] U.S. Cl. ................................... 137/565; 137/559; 137/895; 137/889
[58] Field of Search ............... 137/889, 895, 559, 565

[56] References Cited

U.S. PATENT DOCUMENTS

| | | | |
|---|---|---|---|
| 2,260,936 | 10/1941 | Everson | 137/895 |
| 2,906,834 | 9/1959 | Dyer | 417/40 |
| 2,957,494 | 10/1960 | Stenberg | 137/895 |
| 3,491,948 | 1/1970 | Alexander | 137/895 |
| 3,857,409 | 12/1974 | Aubrey et al. | 137/889 |
| 3,913,606 | 10/1975 | Anderson, Jr. | 137/565 |
| 4,092,993 | 6/1978 | Stevenson | 137/15 |
| 4,171,710 | 10/1979 | Boynton et al. | 137/889 |
| 4,572,230 | 2/1986 | Mirabile | 137/565 |
| 4,646,784 | 3/1987 | de Leeuwe | 137/565 |

Primary Examiner—A. Michael Chambers
Attorney, Agent, or Firm—James M. Ritchey; James M. Ritchey

[57] ABSTRACT

Disclosed is a dynamic, non-recycling pumping system for combining at least one chemical agent with a liquid carrier to produce a mixture for spraying on a target. Included in the subject device is a pump having an adjustable pressurized output line and an adjustable vacuum containing primary suction input line. A carrier reservoir supplies the primary suction line with the carrier that is mixed with a variable amount of chemical agent added through a secondary suction line connected to the primary suction line.

10 Claims, 4 Drawing Sheets

FIG.—2

CHEMICAL MIXING AND DELIVERY SYSTEM

BACKGROUND OF THE INVENTION

1. Field of the Invention

Disclosed is a system for mixing a chemical agent with a carrier fluid and pumping the mixture to a target location. More specifically, a calibration device is incorporated into the suction line of a pump, thereby delivering a predetermined addition of at least one chemical agent into the carrier fluid passing through the pump. Existing pumping devices may be retrofitted to include the subject device.

2. Description of the Background Art

Transferring a diluted chemical agent, via a carrier fluid, onto a selected target often involves mixing a predetermined amount of the agent into a given quantity of carrier fluid within a storage container or reservoir and then pumping the mixture to the desired location. Such a procedure requires time to generate the needed quantity of carrier fluid before the mixing can occur. Further, once the approximate volume of mixture is created any excess quantity must be disposed of in an environmentally safe and legally suitable manner.

A more efficient system, both in time and wasted excess mixture, is an active or dynamic mixing system that does not require a set quantity of carrier fluid, but mixes the chemical agent with the carrier fluid on demand. Further, the active or dynamic mixing process is useful to speed the generally homogeneous combining of the chemical agent into the carrier fluid. For many years numerous inventors have attempted, with very limited success, to harness the inherent pressure of a pumping system to induct chemical agent concentrates into the flow path of a carrier fluid. Such systems include ones employed for spraying insecticides, pesticides, and similar materials.

Current spraying systems often incorporate: a carrier fluid container or reservoir; a pumping system; an overflow or bypass circuit for handling excess carrier mixed with the agent; and a delivery system for placing the mixture on the target. Generally, positive displacement pumps are used in a majority of spraying applications. An inherent problem exists with such spraying systems. In order for a positive displacement pump to function continuously, the constant production of pressurized fluid must be handled. The output must either be routed to the target or rerouted back to the storage reservoir for recycling. As long as the flow is continuous, from the reservoir to the target, such mixing of concentrate works. However, when the mixture is rerouted back to the reservoir the material within the reservoir is enriched in the agent. A separate, second reservoir for receiving the excess mixture is possible, but the fluid mixture in this second reservoir would then need to be delivered or wasted.

Supplied by the subject invention is an alternative to delivering continuously the mixture to the target or recycling to a reservoir. The subject device interrupts the pumping during periods when part of all of the pump's production is no longer being sent to the target. The approach incorporated into the subject device for accomplishing the attenuation of the flow is to include a flow-controlled clutch to modulate or shut off the pump as needed. Further, if the subject device is used with a centrifugal pump a standard technique for frustration of the pump is used to regulated the output pressure or if used with an electric motor the motor is modulated by regulating the on-off period or by employing a standard variable speed control.

SUMMARY OF THE INVENTION

An object of the present invention is to produce a spraying system in which one or more chemical agents are mixed with a carrier to produce a mixture only upon demand for delivering of the mixture to a selected target.

Another object of the present invention is to create a spraying system that eliminates the production of excess hazardous mixtures that required suitable procedures for disposal and waste money to produce.

A further object of the present invention is to disclose a spraying system that allows a user to precisely determine and deliver the quantity of a chemical agent that is added to a liquid carrier to generate a mixture.

An additional object of the present invention is to produce a spraying system having a chemical agent container cleaning device for rinsing the last remaining chemical agent from the container before properly disposing of the container.

Yet another object of the present invention is to construct a spraying system that can be transported by a vehicle to a desired location with minimal risk of a chemical agent spill resulting from a vehicle accident.

Still a further object of the present invention is to present a spraying system adapted to record the total volume of chemical agent mixed with carrier that is delivered to a selected target.

Still another object of the present invention is to produce a chemical agent spraying system capable of using a lower minimum amount of a chemical agent than previous systems.

A dynamic, non-recycling pumping system is disclosed for combining at least one chemical agent with a liquid carrier to produce a mixture for spraying on a target. Comprising the system is a pump having an associated output line and an associated primary suction input line, wherein the pump generates a pressurized output flow of the mixture in the output line and produces a vacuum within the primary suction input line. Included is a carrier reservoir for containing the carrier, wherein the primary suction input line connects the pump to the reservoir. Means for regulating the pump's pressurized output flow of the mixture, means for determining the level of vacuum within the primary suction input line, and means associated with the primary suction line for establishing a desired flow rate of the carrier from the carrier reservoir are incorporated into the subject device. A secondary suction input line for transferring the chemical agent into the primary suction input line is disclosed. Associated with the secondary suction input line is a means for establishing a flow rate of the chemical agent into the primary suction input line.

Other objects, advantages, and novel features of the present invention will become apparent from the detailed description that follows, when considered in conjunction with the associated drawings.

DESCRIPTION OF THE PREFERRED EMBODIMENT

Referring now to FIGS. 1-4, there is shown a preferred embodiment of a chemical mixing and delivery system employed to combine predetermined quantities of a liquid carrier with a chemical agent. Before, herbicides, pesticides, and other like chemical agents are sprayed on a selected target the chemical agent usually needs to be diluted in a liquid carrier to an appropriate concentration. Although other chemical species are well within the realm of this disclosure, generally, the liquid carrier is water. Further, either liquid chemical agents are diluted with the carrier or powdered chemical agents are premixed with a suitable material and then diluted with the carrier.

Figure 1:
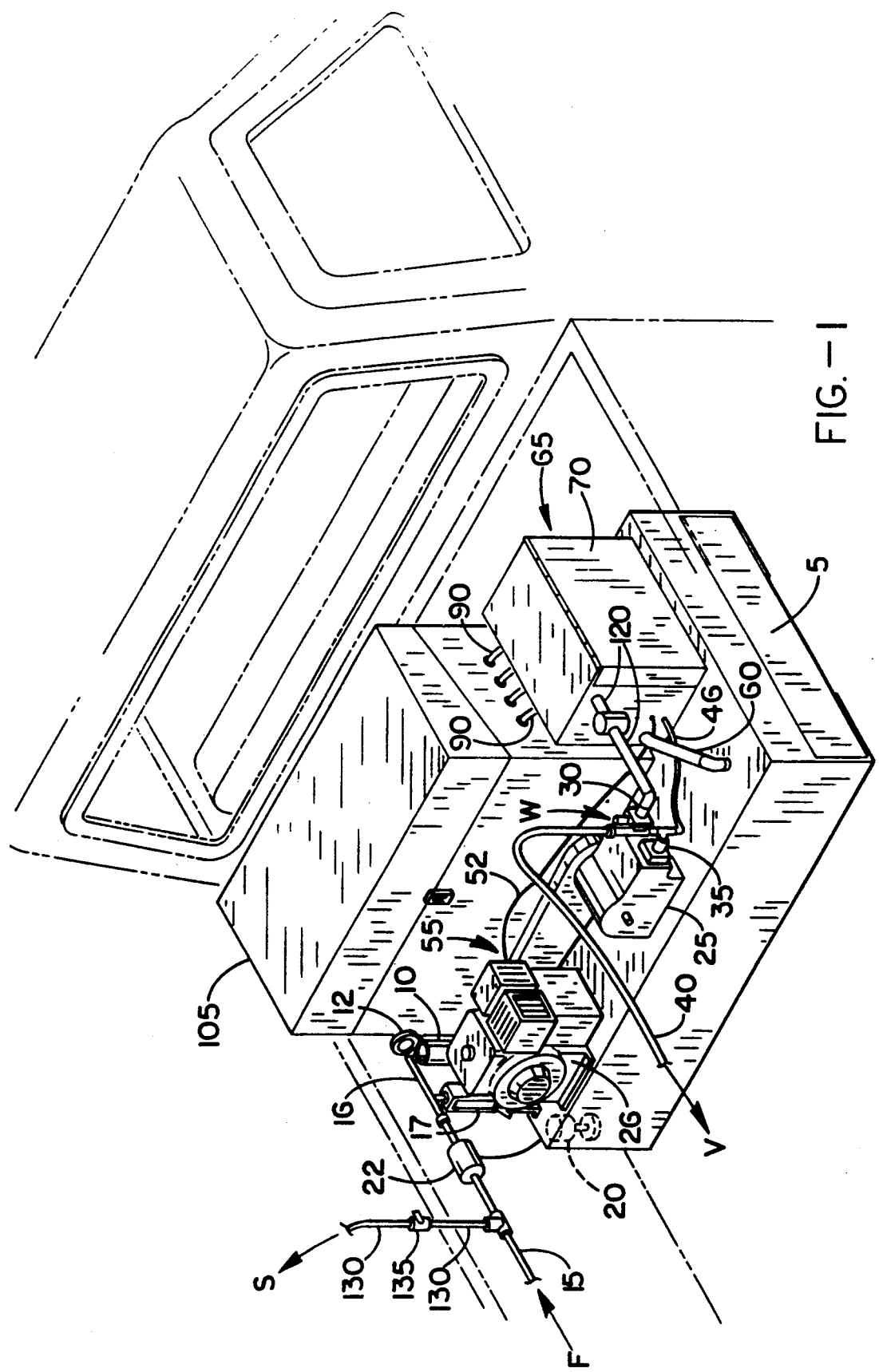
FIG. 1 is a perspective view of the subject device mounted in the bed of a transportation vehicle.

Usually, the target onto which the mixture of carrier and chemical agent is sprayed is at a location that is reached by travel in a vehicle. Therefore, the subject device is preferably mounted within a transportation vehicle. FIG. 1 illustrates mounting the subject spraying apparatus in the bed of a truck, but other types of vehicles are equally suitable for moving the subject system. Targets include homes, yards, businesses, warehouses, fields, trees, and similar items that require a chemical agent spray be applied to them.

Usually, the subject device is incorporated directly into a spray system during construction of that particular unit. However, existing spraying units are readily retrofitted to include the subject device.

As seen in FIG. 1, comprising the subject invention is a liquid carrier reservoir 5. Usually, to facilitate the creation of a compact spraying unit the reservoir serves the duel role of containing the carrier and as a platform onto which is mounted other components of the subject invention. The volume within the reservoir 5 is not critical to the subject invention. Since the spray created by the system draws carrier upon demand, only a minimal amount of carrier needs to be within the reservoir 5. Since one of the benefits of the subject device is that it is usable without the large reservoirs currently needed with many current spraying systems, typically, the reservoir holds between about 1 and about 50 gallons of carrier, usually between about 5 and about 25 gallons of carrier, and generally between about 10 and about 20 gallons of carrier. However, the reservoir 5 may hold volumes less than about 1 gallon and much greater than 50 gallons. The carrier reservoir 5, as are other components of the subject system, is usually fabricated from chemical agent and carrier inert or resistant materials such as metals like stainless steel, polymers, or equivalent substances. Preferably, since the subject device is usually transported within a vehicle, the fabrication materials and methods of construction are suitable for withstanding an impact received in a traffic accident.

Liquid carrier is introduced into the reservoir 5 by means of an intake tube 10 extending from the reservoir 5. Normally, when no carrier is being introduced into the reservoir 5, the intake tube 10 is fitted with a removable cap 12. When carrier is not being added to the reservoir 5 the cap is closed to prevent contamination.

Usually, a user of the subject device transports the system to a desired location that has a supply of carrier water. A hose 15 is connected to the carrier supply source. Carrier water travels through the hose 15 (indicated by direction arrow F) and exits the hose 15 via a nozzle 16 held in position above the intake tube 10 by a bracket 17. This configuration generates an air gap between the tip of the nozzle 16 and the intake tube 10, as required by some governmental regulatory agencies. In some situations, it may be required than an auxiliary pump be used to draw water from the reservoir 5 to avoid potential contamination of a domestic water source.

Preferably, means for regulating the flow of carrier into the reservoir 5 are included in the subject device. A detection device 20 that is sensitive to the level of carrier within the reservoir 5 is actively coupled to a fill valve 22 attached to the hose 15. Many suitable volume detection devices 20 are in existence, a basic example of the detection device 20 is a float that rises with increasing carrier volume and lowers with decreasing carrier volume. Coupled to the float are means to detect if the float is above a predetermined level and if not, the fill valve 22 is activated to deliver more carrier into the reservoir 5 until the needed volume is achieved.

A pump 25 having an associated output line and primary suction input line is driven by a power source 26 that is usually a gasoline engine (as shown in FIG. 1), but may be an electric motor or equivalent device. The pump 25 includes means for handling incoming and exiting fluids. Generated by the pump 25 is a pressurized output flow of a liquid (in particular a mixture of carrier and chemical agent) in the output line. Further, the pump 25 produces a vacuum within the primary suction line. Via a pump intake 30, coupled to the primary suction line, the pump 25 receives a liquid under a suction force and distributes a pressurized liquid through a pump exit 30. The pressurized liquid enters a high pressure spray hose 40 (the output line) and travels (high pressure liquid motion is indicated by arrow V) to an adjustable spray valve of standard manufacture. When the spray valve is closed no high pressure liquid passes through the spray hose 40.

To prevent the creation of excessive pressure within the spray hose 40 during pumping, means are provided to regulate the pump's 25 pressurized output flow of liquid. Included are means for establishing if the pressurized flow of the liquid approaches a predetermined pressure value. The rising pressure within the spray hose 40 can be used to modulate the output of the pump 25 or associated power supply or motor 26. Usually, a pressure gauge 45 coupled to the spray hose 40, via a high pressure line 46, displays the pressure within the spray hose 40 (a gauge with a pressure range from 0 to 600 psi is typical, but not limiting). For excessive use protection, to activate the gauge 45 an on-off valve 47 is generally present. A selected maximum high pressure (typically about 450 psi on the gauge 45) is set within a pressure responsive means. Usually, the pressure responsive means is a feedback regulation valve 50 that controls the operation of the pump 25 by communicating, via an electrical coupling or wire 52, with an electric clutch assembly 55 (including an electric, or equivalent, clutch and coupling agent such as a belt, chain, or the like) that couples the pump power source 26 to the pump 25. Although an electric clutch assembly 55 is depicted, other equivalent current or later developed means of feedback regulation are considered to be within the realm of this disclosure for controlling the level of pump 25 action. When the predetermined pressure level is not achieved, the feedback regulation valve 50 activates the pump 25 by engaging the electric clutch in the clutch assembly 55. However, when the predetermined pressure level is achieved, the feedback regulation valve 50 deactivated the pump 25 by disengaging the clutch in the clutch assembly 55.

The liquid carrier is vacuum transferred from the reservoir 5 by a first primary suction line hose 60, coupled into the reservoir 5, to the mixture control assembly 65. Surrounding the control assembly is a housing for anchoring the various components of the subject device. In particular, the housing has a front panel 67. A front cover plate 70 (usually, including locking means) protects components exposed on the front panel 67 from accidental damage and unintentional or intentional tampering.

The first primary suction line hose 60 enters the control assembly and is coupled to a displayed adjustable carrier flow valve and meter 75. Various types of adjustable flow meters exist. As the carrier passes through the flow valve and meter 75 a flow volume reading is displayed. Adjustments are made in the carrier flow rate until a desired carrier flow is achieved.

Upon exiting from the carrier flow valve and meter 75 the primary suction line becomes a manifold 80 for accepting the addition of a plurality of chemical agents. Additionally, means are connected into the manifold 80 for determining the level of vacuum within the primary suction line or manifold 80. Normally, the vacuum level means comprises a vacuum gauge 85 linked by hoses to the manifold 80 and includes an on-off valve 87 to relieve undo stress on the gauge 85. Therefore, the vacuum gauge 85 is associated with the primary suction input line (manifold 80) between the means associated with the primary suction line for establishing a desired flow rate (flow valve and meter 75) of the carrier from the carrier reservoir 5 and the pump 25.

Figure 2:
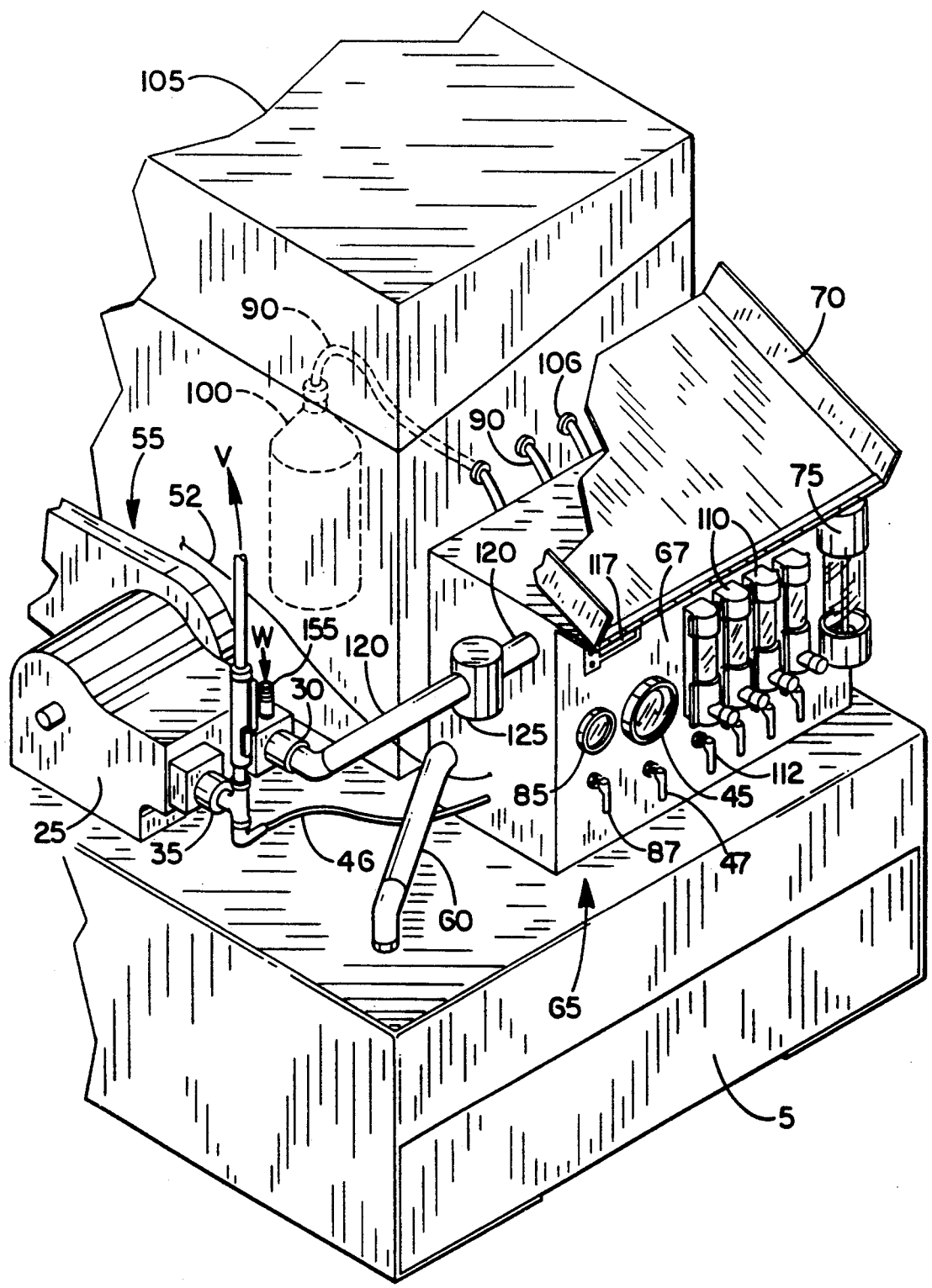
FIG. 2 is a perspective view of the subject device with a protective cover in an open position.
Figure 3:
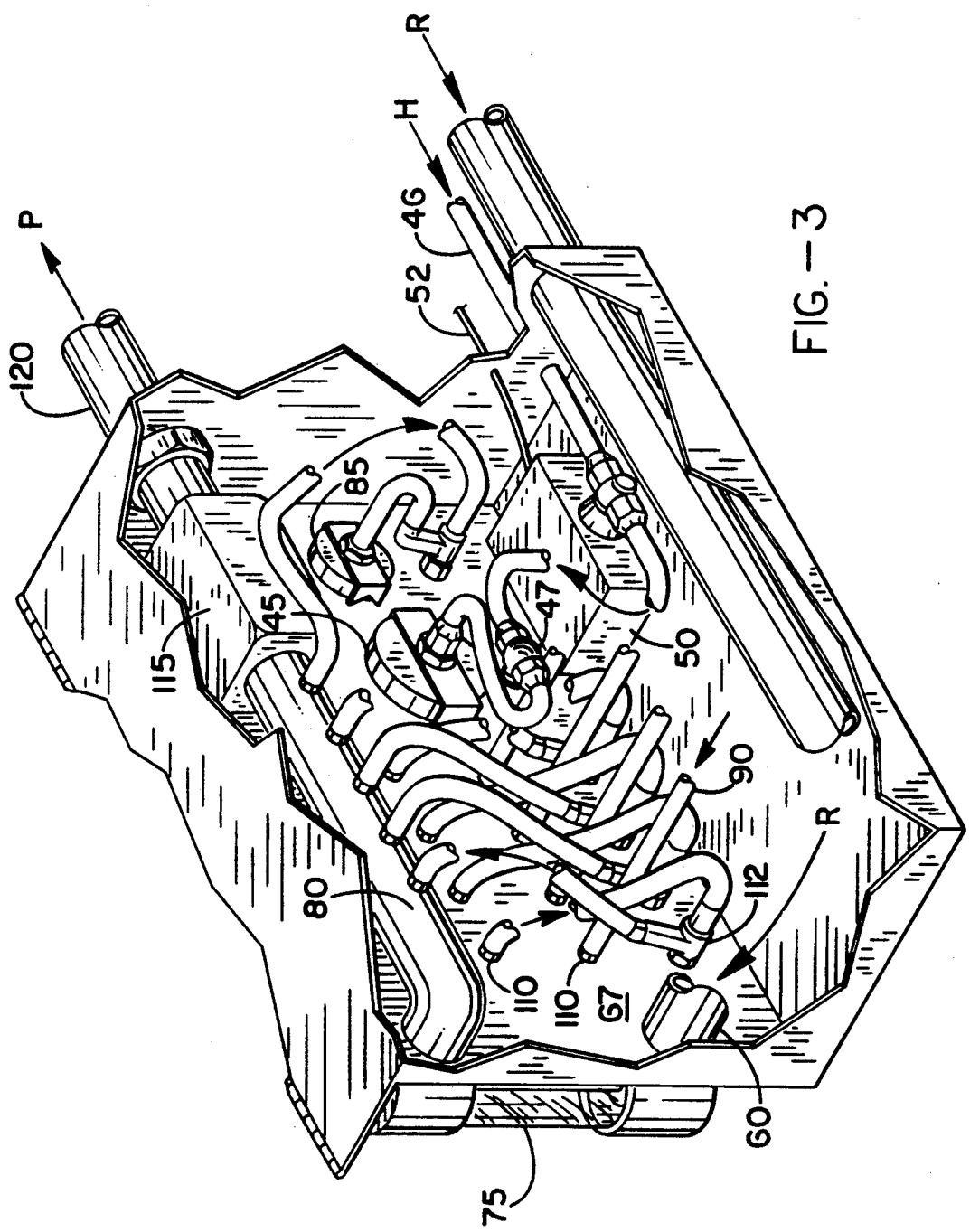
FIG. 3 is a cut-away perspective view of the backside of the subject device.
Figure 4:
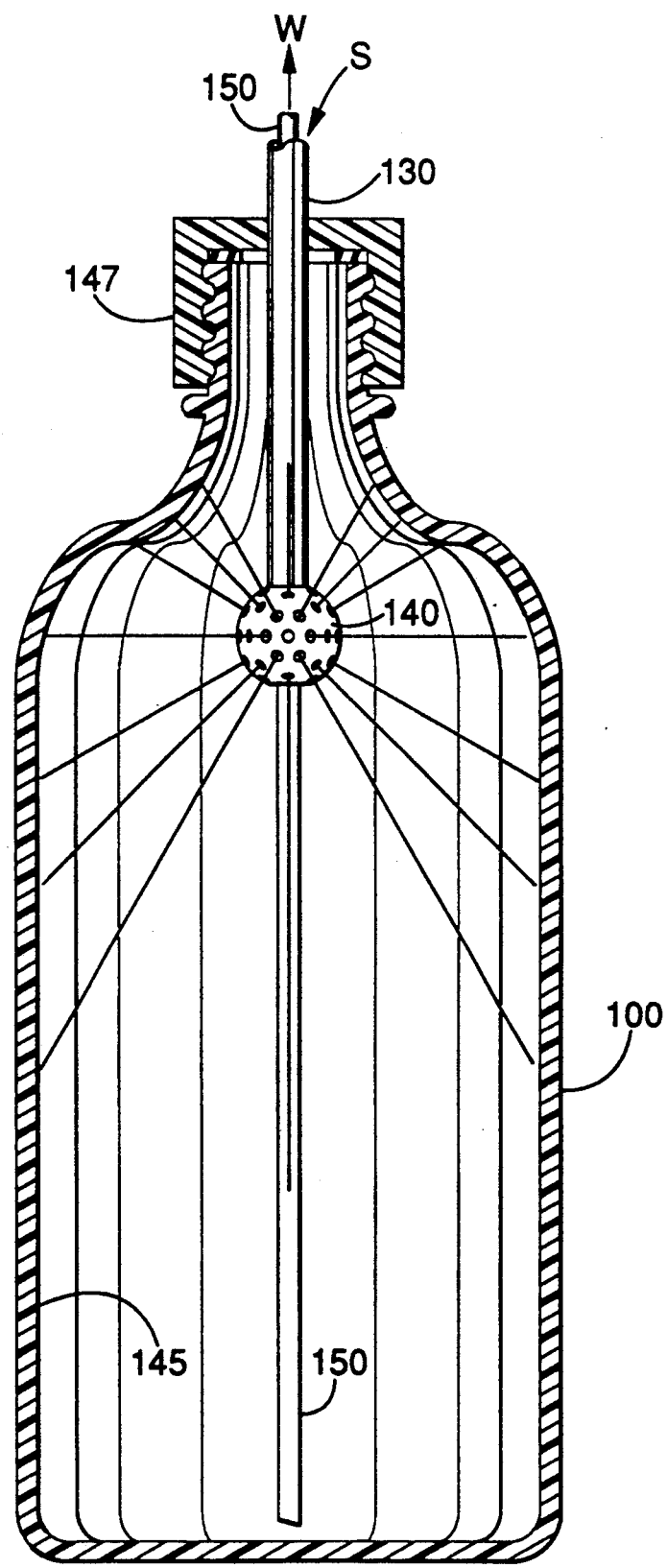
FIG. 4 is a cross-sectional view of a chemical agent container rinsing assembly of the subject device.

Vacuum delivery tubes or secondary suction lines 90 for an unlimited number of chemical agents may be coupled into the primary suction line at or proximate the manifold 80. FIGS. 1-3 illustrate a control assembly having four incoming chemical agent secondary suction lines 90. Each chemical agent is stored in a suitable individual container 100. With a liquid chemical agent that is present at the correct dilution no further apparatus need be associated with the agent's container. However, should the chemical agent require dilution or should it be a powder, additional equipment may be needed to mix the components prior to passage into the manifold 80.

To safely transport and store chemical agent containers 100 a chemical agent storage enclosure 105 is provided. Usually, the chemical agent storage enclosure 105 is secured to the reservoir 5. Preferably, the enclosure 105 is fabricated in a manner that produces an enclosure 105 resistant to harm from a collision of the transporting vehicle. Further, the enclosure 105 usually resists leaking spilled chemical agent.

Generally, each secondary suction line 90 exits the chemical agent storage enclosure 105 through a chemical agent leak resistant seal or grommet 106 mounted in a wall of the enclosure 105. In particular, FIG. 3 illustrates the manner in which the plumbing of the subject device is connected to and within the control assembly 65. To lessen visual clutter produced by multiple delivery tubes, instead of the actual tubes arrows are employed for typical secondary suction line routes (note similar lines for the vacuum gauge 85 connections). A secondary suction line 90 enters the control assembly 65 and first passes through means for establishing a flow rate of the chemical agent. Usually, a chemical agent adjustable flow valve and meter 110 regulates the desired flow. Generally, as with the carrier flow meter, standard construction adjustable flow meters are used to generate the need flow of chemical agent, however, since the volume of chemical agent added is usually much less than the amount of carrier, a smaller adjustable flow meter is employed for the chemical agent than for the carrier. To activate a particular chemical agent flow meter 110, for the delivery of that chemical agent into the manifold 80, a specific chemical agent on-off valve 112 is utilized.

One of the great benefits of the subject device is the ability of the user to precisely mix a chemical agent with a carrier to produce the needed mixture. This precise mixing is accomplished by first establishing the carrier flow rate on the carrier flow valve and meter 75 and then determining the required amount of chemical agent to be added in terms of the flow rate of the chemical agent adjusted on the chemical agent flow meter 110. To stop the delivery of the chemical agent the appropriate on-off valve 112 is closed. Should more than one chemical agent be desired in the carrier additional chemical flow on-off valves 112 are opened, with the appropriate flow meter 110 setting for each chemical agent. Once the required amount of chemical is conveyed to the target the appropriate on-off valves 112 are closed and the chemical agent free carrier used to rinse the remaining chemical agent from the spray hose 40. It should be noted that the subject system permits the mixing of much lower minimal amounts of a chemical agent than prior systems. For example the subject system is easily capable of adding about 0.2 ounces of a chemical agent into the carrier, while older system had significantly higher minimum values for added agent.

For accounting purposes and environmental or safety considerations the total volume of target delivered mixture is often needed. Preferably, for monitoring the total volume, a mixture volume recording meter 115 is incorporated into the primary suction line after the addition manifold 80. A display 117 presents the total volume sprayed on one or more targets.

After the volume recording meter 115, the carrier or mixture enters a second primary suction line hose 120 (an extension of the entire primary suction line, but after the manifold 80 and meter 115) that exists the control assembly and passes to the pump's intake 30. Usually, to prevent clogging the pump 25 with contamination particles, a filter 125 is inserted in the second primary suction line hose.

Once a chemical agent container 100 is drained by having its contents fed into the subject spraying system, the container 100 must be rinsed. Usually, governmental regulations outline the required rinsing technique. Often a triple rinse is used. To facilitate rinsing a chemical agent container 100, a container rinsing assembly is provided with the subject invention. Connected to the incoming carrier hose 15, or by an electric or equivalent pump included system to the reservoir 5, is a rinse hose 130 fitted with a valve 135 for adjusting the carrier flow rate through the rinse hose 130. Liquid carrier is directed through the hose 130 (see liquid carrier motion arrow S) and into a rinse spray nozzle 140. The rinse spray nozzle 140 fits within the chemical agent container 100 and sprays the carrier over the inner walls 145 of the container 100. The carrier used to rinse the container 100 is now contaminated with chemical agent and is suction withdrawn from the container 100 by a removal hose 150 that is connected to the primary suction line at a receiving coupling 155. To remove most of the rinse liquid from the container 100, the end of the removal hose 150 is located proximate the container's 100 bottom wall. To prevent loss of the carrier rinse during spraying of the container 100 a sealing cap 147, with apertures for both the rinse hose 130 and rinse removal hose 150, is provided.

The rate of delivering the carrier spray rinse is variable, as is the rate of removing the contaminated rinse carrier, however, to assist in a thorough cleansing of the container 100, the removal rate is greater than the spray rinse rate. Typically the spray rinse rate is about 0.5 gallons per minute and the removal rate is 5 gallons per minute. These rates are exemplary only and other acceptable rates are possible.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A dynamic, non-recycling pumping system for combining at least one chemical agent with a liquid carrier to produce a mixture for spraying on a target, comprising:
   a) a pump having an associated output line and an associated primary suction input line, wherein said pump generates a pressurized output flow of said mixture in said output line and produces a vacuum within said primary suction input line;
   b) a carrier reservoir for containing said carrier, wherein said primary suction input line connects said pump to said reservoir;
   c) means for regulating said pump's pressurized output flow of said mixture;
   d) means for determining the level of vacuum within said primary suction input line;
   e) means associated with said primary suction line for establishing a desired flow rate of said carrier from said carrier reservoir;
   f) a secondary suction input line for transferring said chemical agent into said primary suction input line; and
   g) means associated with said secondary suction input line for establishing a flow rate of said chemical agent into said primary suction input line.

2. A dynamic, non-recycling pumping system according to claim 1, wherein said means for regulating said pump's pressurized output flow of said mixture comprises:
   a) means for establishing if said pressurized output flow of said mixture approaches a predetermined pressure value and
   b) pressure responsive means sensitive to said output flow's pressure, wherein said pressure responsive means controls operation of a pump associated clutch coupled to a pump power supplying source, whereby said pressure responsive means activates said pump when said output flow pressure is below said predetermined pressure value and deactivates said pump when said output flow is above said predetermined pressure value.

3. A dynamic, non-recycling pumping system according to claim 1, wherein said means for determining said level of vacuum within said primary suction input line comprises a vacuum gauge associated with said primary suction input line between said means associated with said primary suction line for establishing a desired flow rate of said carrier from said carrier reservoir and said pump.

4. A dynamic, non-recycling pumping system according to claim 1, wherein said means for establishing said flow rate of said carrier from said carrier reservoir comprises an adjustable flow valve and flow meter associated with said primary suction line.

5. A dynamic, non-recycling pumping system according to claim 1, wherein said means for establishing said flow rate of said chemical agent comprises an adjustable flow valve and flow meter associated with said secondary suction line.

6. A dynamic, non-recycling pumping system according to claim 1, further comprising means for automatically maintaining the amount of said liquid carrier within said carrier reservoir at a predetermined level.

7. A dynamic, non-recycling pumping system according to claim 1, further comprising a chemical agent container for holding said chemical agent, wherein said chemical agent container accepts said secondary suction input line second end.

8. A dynamic, non-recycling pumping system according to claim 1, further comprising means associated with said primary suction input line for determining a total volume of mixture pumped on said target.

9. A dynamic, non-recycling pumping system for combining at least one chemical agent with a liquid carrier to produce a mixture for spraying on a target, comprising:
   a) a pump having an associated output line and an associated primary suction input line, wherein said pump generates a pressurized output flow of said mixture in said output line and produces a vacuum within said primary suction input line;
   b) a carrier reservoir for containing said carrier, wherein said primary suction input line connects said pump to said reservoir;
   c) means for regulating said pump's pressurized output flow of said mixture, wherein said means for regulating said pump's pressurized output flow of said mixture comprises:
      means for establishing if said pressurized output flow of said mixture approaches a predetermined pressure value and
      pressure responsive means sensitive to said output flow's pressure, wherein said pressure responsive means controls operation of a pump associated clutch coupled to a pump power supplying source, whereby said pressure responsive means activates said pump when said output flow pressure is below said predetermined value and deactivates said pump when said output flow is above said predetermined value;
   d) means for determining the level of vacuum within said primary suction input line, wherein said means for determining said level of vacuum within said primary suction input line comprises a vacuum gauge associated with said primary suction input line between said means associated with said primary suction line for establishing a desired flow rate of said carrier from said carrier reservoir and said pump;

e) means associated with said primary suction line for establishing a desired flow rate of said carrier from said carrier reservoir, wherein said means for establishing said flow rate of said carrier from said carrier reservoir comprises an adjustable flow valve and flow meter associated with said primary suction line;

f) a secondary suction input line for transferring said chemical agent, wherein said secondary suction line has first and second ends, wherein said first end is coupled into said primary suction input line between said pump and said carrier flow rate establishing means and said second end is in said chemical agent;

g) a chemical agent container for holding said chemical agent, wherein said chemical agent container accepts said secondary suction input line second end;

h) means associated with said secondary suction input line for establishing a flow rate of said chemical agent into said primary suction input line, wherein said means for establishing said flow rate of said chemical agent comprises an adjustable flow valve and flow meter associated with said secondary suction line; and i) means associated with said primary suction input line for determining a total volume of mixture pumped on said target.

10. A dynamic, non-recycling pumping system for combining at least one chemical agent with a liquid carrier to produce a mixture for spraying on a target, comprising:

a) a pump having an associated output line and an associated primary suction input line, wherein said pump generates a pressurized output flow of said mixture in said output line and produces a vacuum within said primary suction input line;

b) a carrier reservoir for containing said carrier, wherein said primary suction input line connects said pump to said reservoir;

c) means for regulating said pump's pressurized output flow of said mixture;

d) means for determining the level of vacuum within said primary suction input line;

e) means associated with said primary suction line for establishing a desired flow rate of said carrier from said carrier reservoir;

f) a secondary suction input line for transferring said chemical agent into said primary suction input line;

g) means associated with said secondary suction input line for establishing a flow rate of said chemical agent into said primary suction input line; and h) means for rinsing a container that held said chemical agent with said liquid carrier, thereby producing a carrier contaminated with said chemical agent, wherein said contaminated liquid carrier is sprayed on said target until said container is clean, wherein said rinsing means comprises:

a) a rinse tube having first and second ends, wherein said first rinse tube end is connected to said pump's pressurized output line and said second rinse tube end is adapted to fit within said chemical agent container and deliver a spray of said liquid carrier for rinsing said container and b) a suction tube having first and second ends, wherein said first suction tube end is connected to said primary suction input line and said second suction tube end is adapted to fit within said container for removing said contaminated liquid carrier from said container, wherein said suction tube removes said contaminated liquid carrier at a rate faster than said delivery of said liquid carrier.

* * * * *